(12) United States Patent
Lapidous

(10) Patent No.: US 6,874,126 B1
(45) Date of Patent: Mar. 29, 2005

(54) METHOD AND APPARATUS FOR CONTROLLING CONTENT DISPLAY BY THE CURSOR MOTION

(75) Inventor: Eugene Lapidous, Saratoga, CA (US)

(73) Assignee: View Space Technologies, Saratoga, CA (US)

( * ) Notice: Subject to any disclaimer, the term of this patent is extended or adjusted under 35 U.S.C. 154(b) by 561 days.

(21) Appl. No.: 10/006,522

(22) Filed: Nov. 30, 2001

(51) Int. Cl.⁷ .............................................. G09G 5/00
(52) U.S. Cl. ..................... 715/711; 715/715; 715/764; 715/808
(58) Field of Search ................................ 715/705–765, 715/788, 808, 860, 862, 501.1; 345/705–715, 788, 808, 764, 765

(56) References Cited

U.S. PATENT DOCUMENTS

| | | |
|---|---|---|
| 4,789,962 A | 12/1988 | Berry et al. |
| 4,984,152 A | 1/1991 | Muller |
| 5,287,448 A | 2/1994 | Nicol et al. |
| 5,546,521 A * | 8/1996 | Martinez ..................... 345/711 |
| 5,686,937 A | 11/1997 | Li |
| 5,754,176 A * | 5/1998 | Crawford .................... 345/711 |
| 5,757,358 A | 5/1998 | Osga |
| 5,805,165 A | 9/1998 | Thorne, III et al. |
| 5,911,067 A | 6/1999 | Owens et al. |
| 5,969,705 A | 10/1999 | Fisher et al. |
| 5,973,688 A * | 10/1999 | May ........................... 345/709 |
| 5,987,454 A | 11/1999 | Hobbs |
| 5,995,101 A * | 11/1999 | Clark et al. ................. 345/711 |
| 6,040,817 A | 3/2000 | Sumikawa |
| 6,072,486 A | 6/2000 | Sheldon et al. |
| 6,091,395 A | 7/2000 | DeStefano |
| 6,091,415 A | 7/2000 | Chang et al. |
| 6,157,363 A | 12/2000 | Haine |
| 6,239,796 B1 | 5/2001 | Alexander |
| 6,272,485 B1 | 8/2001 | Sragner |
| 6,311,215 B1 | 10/2001 | Bakshi et al. |
| 6,345,300 B1 | 2/2002 | Bakshi et al. |
| 6,437,800 B1 * | 8/2002 | Malamud et al. ........... 345/711 |
| 6,542,163 B2 * | 4/2003 | Gorbet et al. ............... 345/711 |
| 6,542,164 B2 * | 4/2003 | Graham ...................... 345/711 |
| 6,594,696 B1 * | 7/2003 | Walker et al. .............. 709/223 |

(List continued on next page.)

OTHER PUBLICATIONS

Microsoft Office, Assistance Center, "Complete Tasks Quickly with Smart Tags in Office XP" http://office.microsoft.com/assistance/2002/articles/oQuickSmartTags.aspx 5 pages, downloaded Oct. 25, 2001.

(List continued on next page.)

*Primary Examiner*—John Cabeca
*Assistant Examiner*—Tadesse Hailu
(74) *Attorney, Agent, or Firm*—Blakely, Sokoloff, Taylor & Zafman, LLP

(57) ABSTRACT

Methods and apparatuses for controlling display of supplemental content on a computer screen are described. In one embodiment, a method for controlling display of supplemental content on a computer screen includes detecting that the supplemental content is displayed on the computer screen. The display of the supplemental content is controlled by a cursor position relative to a first predefined region. The method further includes triggering display of an interface element associated with the supplemental content when the cursor is positioned inside the predefined first region, defining a second region that covers at least a portion of the interface element and the current position of the cursor, and continuing the display of the supplemental content upon detecting that the cursor is positioned outside of the first region but within the second region.

67 Claims, 12 Drawing Sheets

U.S. PATENT DOCUMENTS

| | | | | |
|---|---|---|---|---|
| 6,643,824 | B1 * | 11/2003 | Bates et al. | 715/501.1 |
| 2001/0045949 | A1 * | 11/2001 | Chithambaram et al. | 345/418 |
| 2002/0118221 | A1 * | 8/2002 | Hudson et al. | 345/711 |
| 2003/0076344 | A1 * | 4/2003 | Chatani et al. | 345/711 |

OTHER PUBLICATIONS

Business Week Online, Technology & You "Smarter Tools to Scour a Wider Web" Mar. 26, 2001 http://www.businessweek.com/magazine/content/01_13/b3725051.htm 3 pages, downloaded Oct. 25, 2001.

Flyswat Corporation, Inc. What is Flyswat: how to use it in Internet Explorer. http://www.flyswat.com/howto_flycons.html 1 page downloaded Aug. 25, 2001.

Jef Raskin, The Humane Interface: New Directions for Designing Interactive Systems. Addison–Wesley, Reading, Massachusetts, 2000. pp 93–97.

PCT Search Report dated Apr. 18, 2002, 4 pages.

* cited by examiner

METHOD AND APPARATUS FOR CONTROLLING CONTENT DISPLAY BY THE CURSOR MOTION

FIELD OF THE INVENTION

This invention relates generally to enabling user interaction with content displayed on the computer screen; and more particularly to controlling removal of supplemental content from the computer screen.

BACKGROUND OF THE INVENTION

The amount of information available over the Internet rapidly increases with the growth in the number of web sites and complexity of the content. However, the amount of information presented to the user during a single interactive session depends on the screen space available to render new content. With increase of available connection bandwidth, the screen space becomes the main limiting factor for the amount of the accessible content.

The amount of information presented during the same interactive session can be increased by augmenting the main document with supplemental content. This supplemental content may contain, for instance, help or hints describing a sequence of actions to achieve a desired result, the title of a link in the main document, links to documents or advertisements of the related products and services, etc. A common way to display such supplemental information when the available screen space is already occupied by the main document is to render the supplemental content in the area that overlaps the main browsing window. The supplemental content can be presented in a separate window with standard controls, in a rectangular panel (a link title or a tool tip) or in the area with a complex shape (balloon help or a free-form image used in the advertisement). Different presentation methods are developed to balance ease of access to the supplemental content (including actions required to display supplemental content and to interact with it) with ease of its removal when it is no longer needed.

A separate window with a "close" button, also known as a pop-up window, allows the user to interact with its content in the same fashion as with the main document. However, to close such a window, the user has to perform a set of additional operations (move the cursor to the "close" button of the pop-up window, click on the "close" button and move the cursor back to the area of interest in the main document). Pop-up windows are often annoying when they are opened without the user's request because they obscure the main document and the operations required to close each overlapping window interrupt the user's workflow. The use of popup windows is more acceptable if they are opened in response to the user action, such as a click on a cursor button when the "Alt" key is pressed. For instance, applications developed by Flycast™ Corporation and Atomica™ Corporation use such pop-up windows with links or dictionary definitions related to a selected word.

Other techniques allow a user to select which type of supplemental content associated with the main document should be displayed. In particular, "Smart Tags" used in the Office XP™ (RTM) product developed by Microsoft™ Corporation allow the user to choose the type of supplemental content for display by interacting with an interface element appearing near the current cursor position. Once a new pop-up window with the supplemental content is opened, a separate action is needed to close this pop-up window before resuming previous work, making the use of the supplemental content difficult and inconvenient for the user, and therefore decreasing the benefits of the provided service.

In order to make an interaction with the supplemental content more convenient, some prior art techniques display the supplemental content close to the cursor, decreasing the distance to the available interface elements. Other known solutions put controls of the multiple windows in a common area (e.g., a desktop bar at the edge of the screen), also speeding up navigation. However, removal of the supplemental content in all these cases still requires the user to move the cursor away from the current area of interest in the main document. To resume interaction with the main document, the cursor has to be moved back. Moving the cursor between the main and supplemental content is especially inconvenient if multiple instances of supplemental content are accessed for the same main document. In these cases, simplification of the content removal process becomes particularly important.

It is known in the prior art to trigger automatic removal of the supplemental content by the cursor motion during the regular navigation process. For instance, supplemental content known as a tool tip appears when cursor stops over the link or an interface element. Internet browsers, such as the Internet Explorer™ (RTM), developed by the Microsoft Corporation, remove each displayed tool tip from the screen when the cursor moves into the area of the tool tip or exits a screen region associated with a related link or an interface element. Due in large part to this easy removal method, tool tips are widely used both for the links inside the hypertext documents and for the elements of the application user interfaces. However, usefulness of tool tips is limited by the difficulty of interaction with their content since the cursor motion to the tool tip automatically removes the tool tip from the screen.

Some prior art solutions attempt to trigger removal of the supplemental content by easy-to-generate events other than a cursor motion. For instance, as described in the U.S. Pat. No. 5,754,176, supplemental content can be removed if the user did not select such content during its display for a pre-defined time period. Other solutions include dosing the last window with the supplemental content when a new window appears, or performing a special gesture over the related element of the main document. However, in all these cases, the user has to spend some additional time and/or efforts before resuming work with the main document.

One solution that increases display choices for the content removable by a cursor motion is described in the U.S. Pat. No. 5,995,101. This solution allows the expansion of a tool tip (displayed after the cursor stops over an interface element) if the cursor is kept in the same area for a pre-defined time. However, the user cannot interact with the content within the tool tip (e.g., the user cannot scroll the internal text or select an embedded link). One other disadvantage of this method is that the user may keep the cursor in the same place for a purpose other than the increase of the obscured area of the main document.

Another set of problems arises when the user finds supplemental content presented in the pop-up window interesting enough to replace the main document. Pop-up windows are often displayed without control buttons such as "Back" and "Forward" or an address bar, in order to save space. Even when the user interface of the new window with supplemental content is sufficient, closing the old window with the main document causes loss of the browsing history for the current session: pressing the "Back" button in the new window does not recall the document from the closed window.

Lack of convenient ways to manage supplemental content decreases its benefits to the user, limiting the amount of information that can be accessed during each session.

SUMMARY OF THE INVENTION

The present invention relates to various aspects of controlling display of supplemental content on a computer screen.

In one aspect of the present invention, an exemplary method for controlling display of supplemental content on a computer screen includes detecting that the supplemental content is displayed on the computer screen. The display of the supplemental content is controlled by a cursor position relative to a first predefined region. The method further includes triggering display of an interface element associated with the supplemental content when the cursor is positioned inside the predefined first region, defining a second region that covers at least a portion of the interface element and the current position of the cursor, and continuing the display of the supplemental content upon detecting that the cursor is positioned outside of the first region but within the second region.

According to another aspect of the present invention, an exemplary method for controlling display of supplemental content on a computer screen includes detecting that the supplemental content is visible on the computer screen, and displaying an interface element associated with the visible supplemental content upon detecting an occurrence of an event related to a cursor motion. In one embodiment, the event related to the cursor motion is either a reduced cursor motion or a lack of the cursor motion for a predefined time period. The method further includes defining a control region that covers at least a portion of the interface element and a current position of the cursor, and canceling the display of the supplemental content upon detecting that the cursor is positioned outside of the control region.

In yet another aspect of the present invention, an exemplary method for controlling display of supplemental content on a computer screen includes detecting an occurrence of at least one event related to a cursor motion while the supplemental content is visible on the computer screen, identifying location of the cursor at the time the occurrence was detected, and defining a control region covering the identified location of the cursor. The control region has at least one border segment located at a predefined distance from the identified location of the cursor. The method further includes canceling the display of the supplemental content upon detecting that the cursor is positioned outside of the control region.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Figure 1:
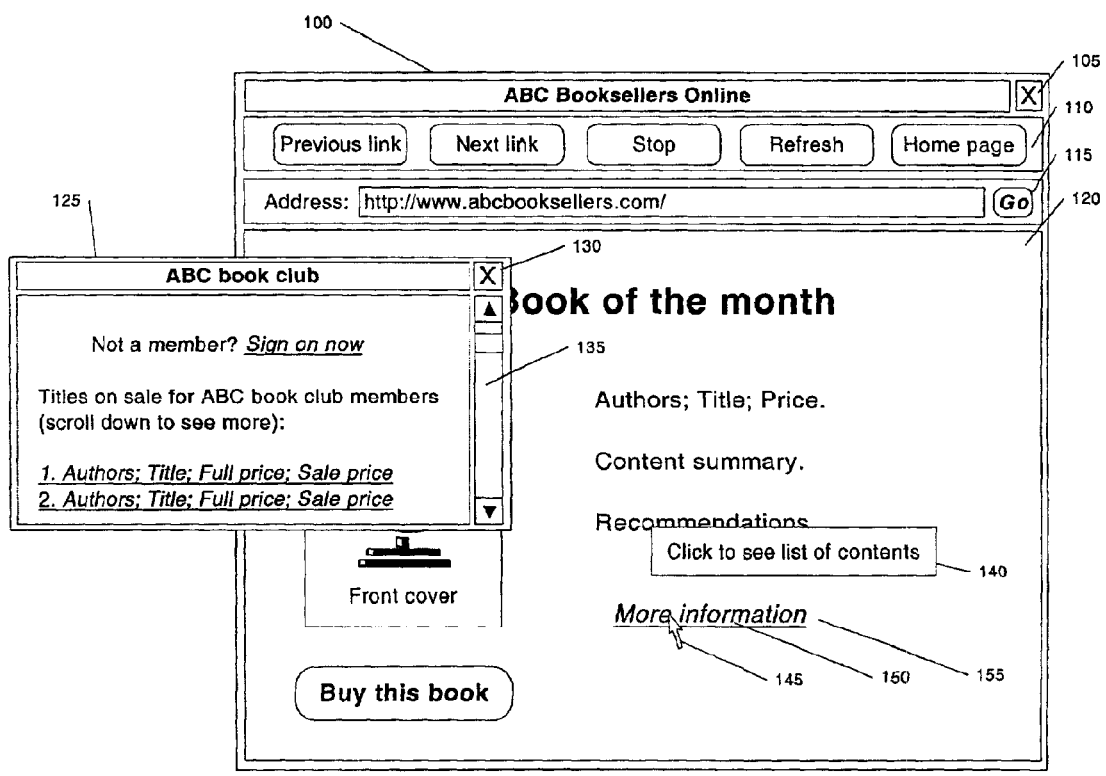
FIG. 1 illustrates an exemplary user interface facilitating control of supplemental content display, according to a prior art embodiment.

Methods and apparatuses for controlling display of the content on a computer screen are described. In the following description, for purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

Some portions of the detailed descriptions, which follow, are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus. Instructions are executable using one or more processing devices (e.g., processors, central processing units, etc.).

The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

Overview

The present invention relates to controlling display of supplemental content presented on a computer screen. Supplemental content represents any content that is displayed on the screen at the same time with the other content that is the main subject of the user's interest. This other content is subsequently referred to as main content. Supplemental content may cover a portion of the main content or may be temporarily embedded into the main content. Supplemental content may or may not be related to the main content. Supplemental content may be provided by the vendor of the main content, for instance, as a navigational hint or a title of the hypertext link. Alternatively, supplemental content may be provided by the independent service with or without the user's request, such as an advertisement displayed by the Internet Service Provider or a stock price alert generated by an online stock brokerage. In addition, supplemental content can be provided by the application or an operating system running on the user's computer, such as a non-modal dialog box informing the user about the status change or offering the user to perform non-critical maintenance operations.

Prior art methods of controlling supplemental content are illustrated in FIG. 1. FIG. 1 depicts window 100 of the Internet Browser, containing interface elements such as "close" button 105, navigation toolbar 110, address bar 115 and client area 120. Client area 120 contains exemplary main content requested by the user, such as a description of a book. In addition to the main content rendered in the client area 120, FIG. 1 demonstrates two examples of the supplemental content, partially overlapping the main content.

The first example is a pop-up window 125, containing supplemental content such as an advertisement. The script contained in the main content can open window 125 without a direct request from the user. Pop-up windows may contain standard means for manipulating content, such as scroll bar 135 or "close" button 130. In order to close window 125, the user has to click on "close" button 130 or perform another known action for closing a generic window (e.g., the action may include pressing "Alt" and "F4" keys while the pop-up window is in the foreground). The need for a special action to remove a pop-up window distracts the user's attention from the main content, creating an annoyance factor that makes it less likely that the user will click on any links contained in the advertisement.

The second example is a tool tip 140, appearing when cursor 145 pauses inside a predefined control region 155 associated with link 150. A tool tip is usually rendered outside of predefined control region 155 to avoid obscuring the area of interest. Supplemental content within a tool tip can include, for example, a title attribute of link 150. Tool tip 140 is removed from the screen when the cursor moves outside of region 155. Tool tip 140 does not contain any links or other interface elements, because it disappears immediately after the cursor leaves region 155. While the visibility control of tool tip 140 is very convenient for the user, lack of means to interact with such supplemental content limits its usefulness.

The present invention addresses the problems described above by allowing interaction with supplemental content while enabling easy removal of the supplemental content from the screen. In one embodiment, a technique is provided for enabling easy removal of supplemental content presented to the user in a pop-window or any other window that conventionally requires more cumbersome content-removal actions than a mere cursor motion. In this embodiment, once it is detected that the supplemental content is visible on the screen, the cursor motion is monitored for identifying a particular predefined event related to the cursor motion. This event may be a reduction in the cursor motion, an absence of the cursor motion for a predefined time interval, a particular movement of the cursor (e.g., a gesture to reproduce a circle), or any other similar event.

Figure 2:
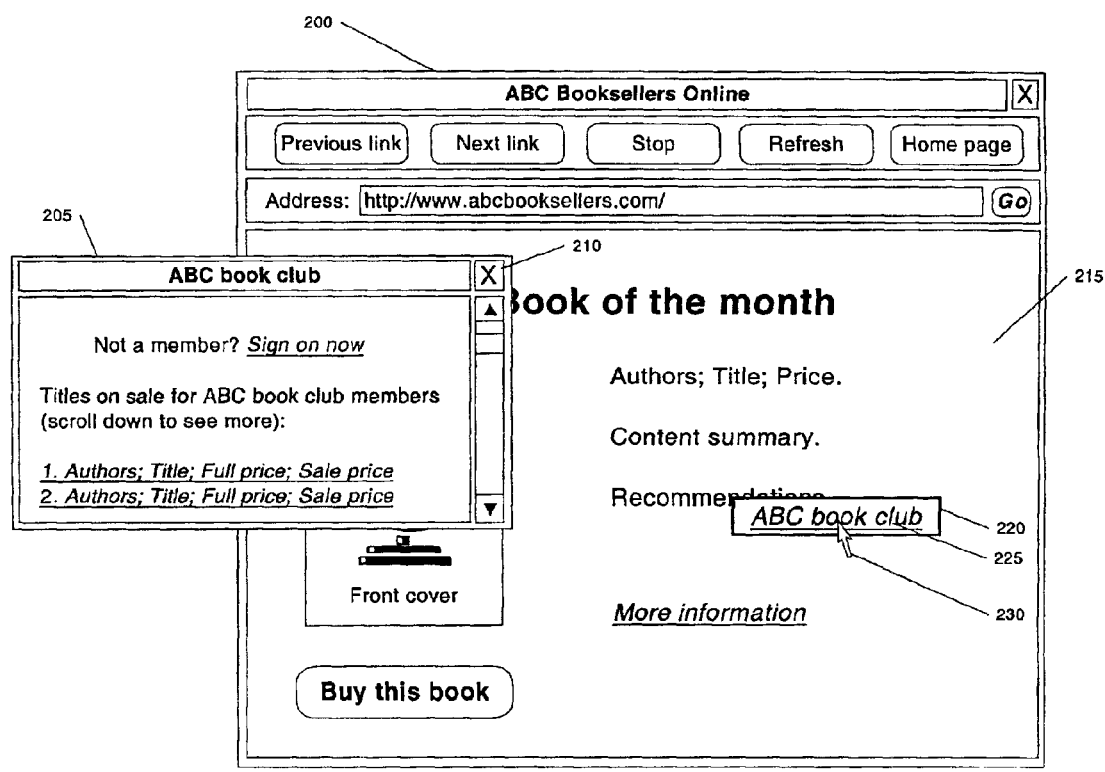
FIGS. 2, 3A, 3B and 4 illustrate exemplary user interfaces facilitating control of supplemental content display, according to various embodiments of the present invention.

Once this event is identified, the cursor position at the time of this event is determined, and a floating control region is defined covering the cursor position. This control region is referred to as "floating" because its location on the screen is not fixed and depends on the cursor position at the time of the event. In one embodiment, the floating control region has one or more visible borders with at least one border segment that depends on the current cursor location, as will be described in greater detail below. FIG. 2 illustrates an exemplary floating control region 220 that is defined for supplemental content in pop-up window 205 when a reduced cursor motion is detected. In the example illustrated in FIG. 2, all borders of control region 220 are visible, and all border segments depend on the current cursor location 230.

The control region controls removal of the supplemental content from the screen. That is, the supplemental content is displayed while the cursor is positioned inside the control region. Once it is detected that the cursor is positioned outside of the control region, the supplemental content is removed from the screen. At this time, the control region also becomes invisible. Thus, a single cursor move outside of the control region restores free access to the areas of the main content previously covered by the supplemental content and the control region.

In one embodiment, the floating control region includes at least a portion of an interface element associated with the supplemental content. The interface element allows the interaction with the supplemental content that does not cause removal of the supplemental content from the screen. For example, the interface element may depict a link related to the supplemental content or have any other graphical representation. FIG. 2 illustrates an exemplary interface element 225 that is rendered as a link related to the supplemental content of pop-up window 205. In one embodiment, when the user selects interface element 225, pop-up window 205 disappears and the main content in client area 215 is replaced by the supplemental content. In another embodiment, when the user selects interface element 225, pop-up window 205 does not disappear. Rather, the user's selection indicates a desire to keep pop-up window 205 open (e.g., so that the user may interact with the scroll bar or other components of pop-up window 205). The features and functionality of the interface element will be described in greater detail below.

In one embodiment, new supplemental content can be displayed on the screen after the removal of pop-up window 205. While the new supplemental content is visible, a reduced cursor motion (or an occurrence of any other event described above) can be detected at a new cursor position. Then, a new control region is defined at a new location. The new control region has at least one border segment that is different from a corresponding border segment of control region 220. However, the new control region will have the same shape and the same offset from the current cursor position as control region 220, thereby forming the user's kinesthetic memory that makes the interaction with the control region less distractive.

Figure 3A:
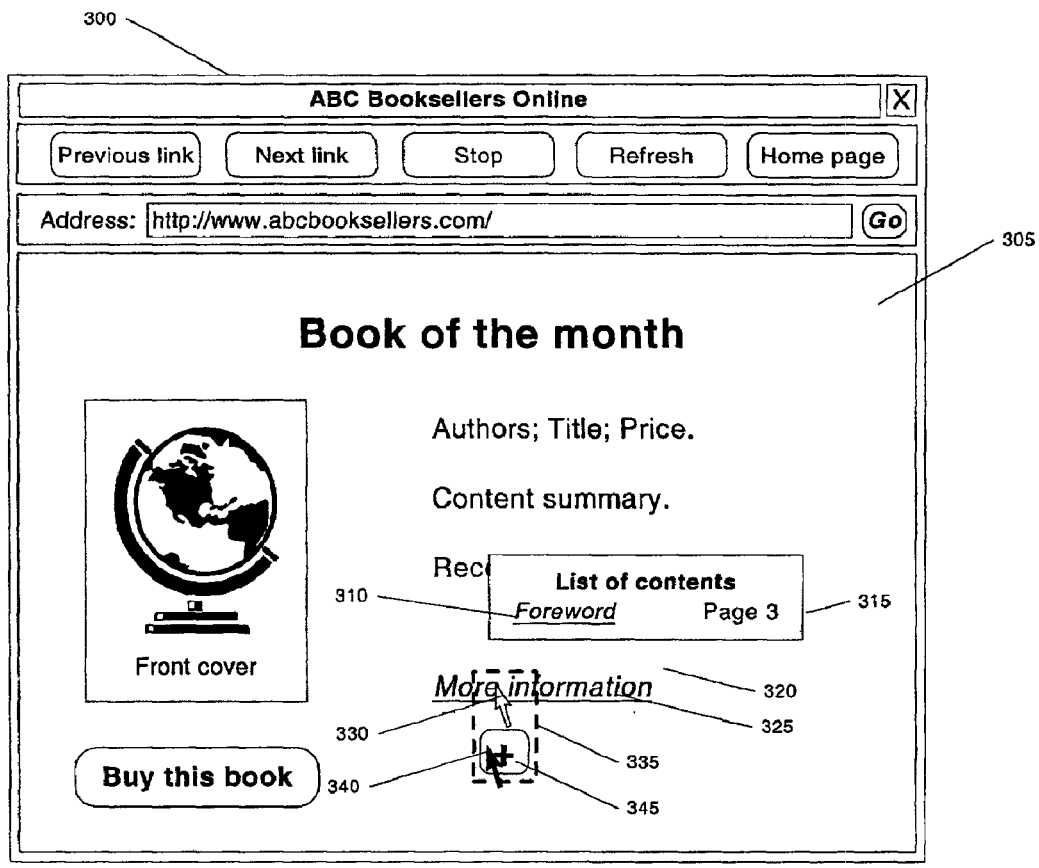

As described above, some prior art techniques (e.g., a tool tip mechanism) enable easy removal of supplemental content from the screen. Specifically, the removal is controlled by a cursor position relative to a predefined region within the main content. The supplemental content becomes visible on the screen once the cursor is detected inside the predefined region, and the supplemental content is removed from the screen once the cursor is detected outside of the predefined region. As a result, the user is unable to interact with the supplemental content. An example of such supplemental content is the content of tool tip 140 illustrated in FIG. 1. One embodiment of the present invention provides a technique that allows user interaction with the supplemental content while maintaining easy-removal functionality provided by the prior art. In this embodiment, once it is detected that the supplemental content is displayed on the computer screen, an interface element associated with the supplemental content is also displayed. As described above, the supplemental content becomes visible when the cursor is detected inside the predefined control region. Referring to FIG. 3A, an example of such situation is illustrated, in which the supplemental content of tool tip 315 becomes visible when the cursor is positioned inside predefined control region 320. Once the supplemental content is displayed, interface element 345 is also displayed while the cursor is still located inside control region 320.

Also, an interface region is defined that covers the current position of the cursor and at least a portion of the interface element. The interface region allows the user to interact with the supplemental content via the interface element while enabling the removal of the supplemental content from the screen by a simple cursor motion. That is, the supplemental content remains visible while the cursor is inside the interface region, even if the cursor is positioned outside of the predefined control region. The display of the supplemental content is canceled when it is detected that the cursor is positioned outside of both the interface region and the predefined control region. At this time, the display of the interface element and the interface region is also canceled. Referring again to FIG. 3A, interface region 335 covers interface element 345 and cursor position 330 detected at the time interface element 345 became visible. When the cursor moves outside of both regions 335 and 320, tool tip 315 with its content is removed from the screen, as well as interface region 335 and interface element 345. However, if the user chooses to interact with the supplemental content of tool tip 315, the user can select interface element 345, causing a change in the display of the supplemental content. For example, the user can select interface element 345 to expand the display area of the supplemental content. The user can then perform various actions pertaining to the supplemental content, as will be described in greater detail below. The display of the extended area can be cancelled by moving the cursor outside of the expanded area.

In one embodiment, the interface element has a floating nature. That is, the display of the interface element begins at a certain offset from a current cursor position and always has the same shape to allow the user to employ a motion of the same amplitude and direction each time the user wishes to select the interface element, thereby forming the user's kinesthetic memory that makes the interaction less distractive. After the interface element is displayed, it remains at the same position until its display is canceled. The features and functionality of the interface element and interface region will be described in more detail below.

Accordingly, the present invention enables easy removal of the supplemental content from the screen while allowing user interaction with the supplemental content. Further, the interaction with the supplemental content is simplified and its interruption of the user's work with the main content is minimized. Moreover, the main content can be conveniently replaced with the supplemental content of choice while preserving prior browsing history.

Control of Supplemental Content Display

Figure 7:
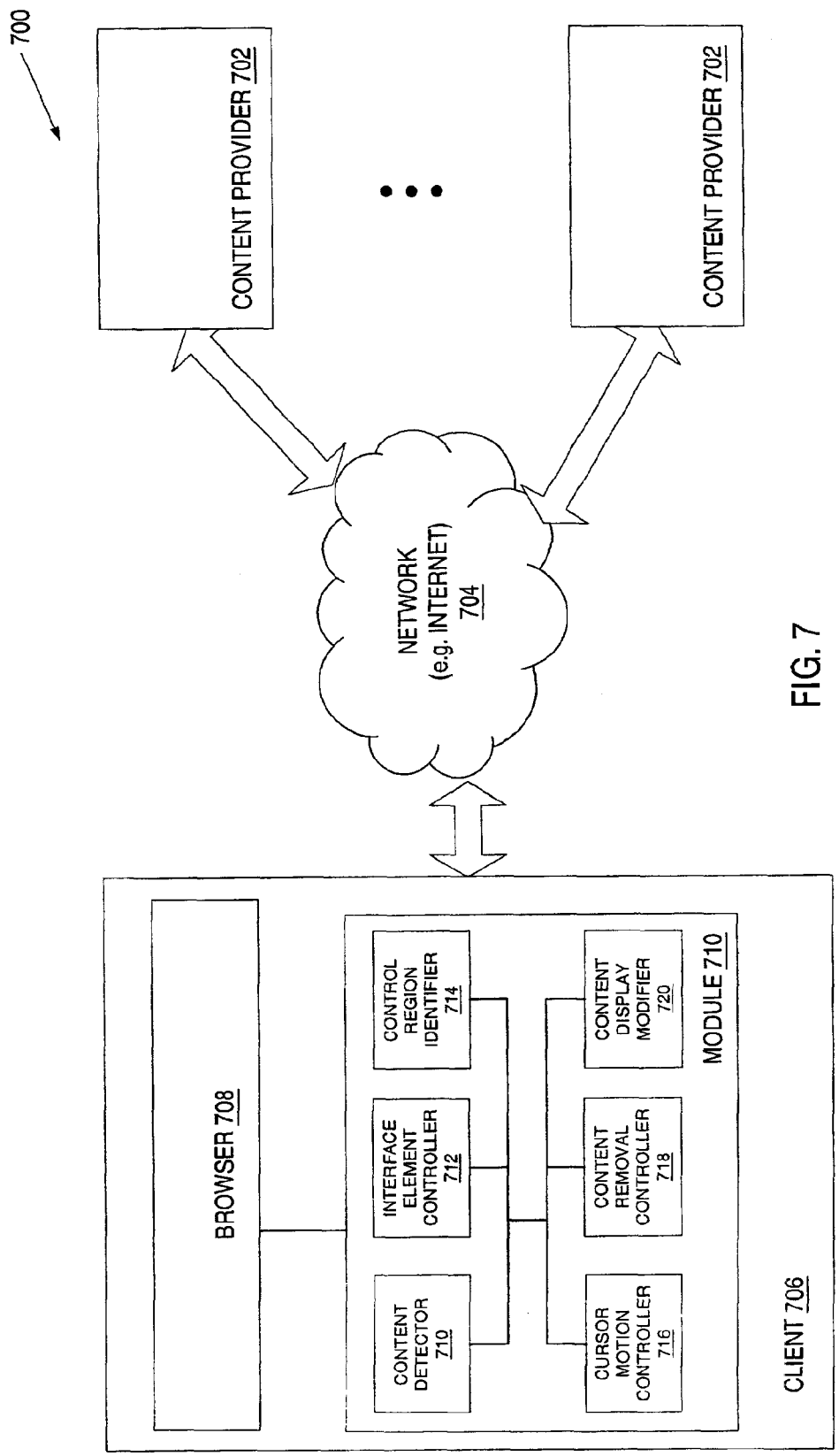
FIG. 7 is a block diagram of a system 700 for controlling display of supplemental content, according to one embodiment of the present invention.

FIG. 7 is a block diagram of a system 700 for controlling display of supplemental content, according to one embodiment of the present invention. System 700 includes a client computer 706 coupled to multiple content providers 702 via a network 704. Network 704 may be a private network (e.g., Intranet, LAN, etc.) or a public network (e.g., Internet, wireless Internet, etc.). Client 706 includes a browser application 708 (e.g., Internet Explorer) that requests content from content providers 702 via network 704 and displays the received content on the computer screen. The features and functionality of browsers are well known in the art. As described above, the main content displayed on the screen can be augmented by supplemental content. Client 706 further includes a module 709 that cooperates with browser 708 to control the display of the supplemental content on the screen.

In one embodiment, module 709 includes a content detector 710, a cursor motion controller 716, a control region identifier 714, and a content removal controller 718. Content detector 710 is responsible for detecting whether the supplemental content is visible on the computer screen.

In one embodiment, the supplemental content is displayed in a separate window that can be closed by more cumbersome actions than a mere cursor movement (e.g., a pop-up window 205 of FIG. 2). In this embodiment, cursor motion controller 716 is responsible for detecting an occurrence of at least one predetermined event related to the cursor motion while the supplemental content is visible on the screen. This event may be a reduction in the cursor motion, an absence of the cursor motion for a predefined time interval, a particular movement of the cursor (e.g., a gesture to reproduce a circle), or any other similar event that involves no more action than a cursor movement. Once an occurrence of such event is detected, control region identifier 714 defines a floating control region covering the cursor position at the time of the detected event. In one embodiment, control region identifier 714 locates at least one border segment of the control region at a predefined distance from the identified cursor position. Further, content removal controller 718 controls removal of the supplemental content from the screen by triggering the removal when the cursor is detected outside of the control region. In one embodiment, module 709 further includes an interface element controller 712 that displays at least a portion of an interface element within the control region. The interface element enables the user to interact with the supplemental content as will be described in more detail below.

In another embodiment, the supplemental content becomes visible when the cursor is detected inside a predefined first region (e.g., region 320 of FIG. 3A that triggers the display of supplemental content in tool tip 315). In this embodiment, cursor motion controller 716 determines the cursor position within the predefined first region once it is detected that the supplemental content is visible on the screen. In addition, interface element controller 712 displays an interface element associated with the supplemental content. In one embodiment, interface element controller 712 locates the interface element at a predetermined offset from the identified cursor location. Next, control region identifier 714 defines a control region covering the current cursor position and at least a portion of the interface element. Further, content removal controller 718 controls removal of the supplemental content from the screen by triggering the removal when the cursor is detected outside of both the predefined first region and the control region.

In either embodiment, module 709 may further include a content display modifier 720 that is responsible for altering the display of supplemental content upon the user's selection of the interface element. For example, content display modifier 720 may expand the size of the area containing the supplemental content or replace the main content with the supplemental content, as will be described in more detail below.

Figure 8A:
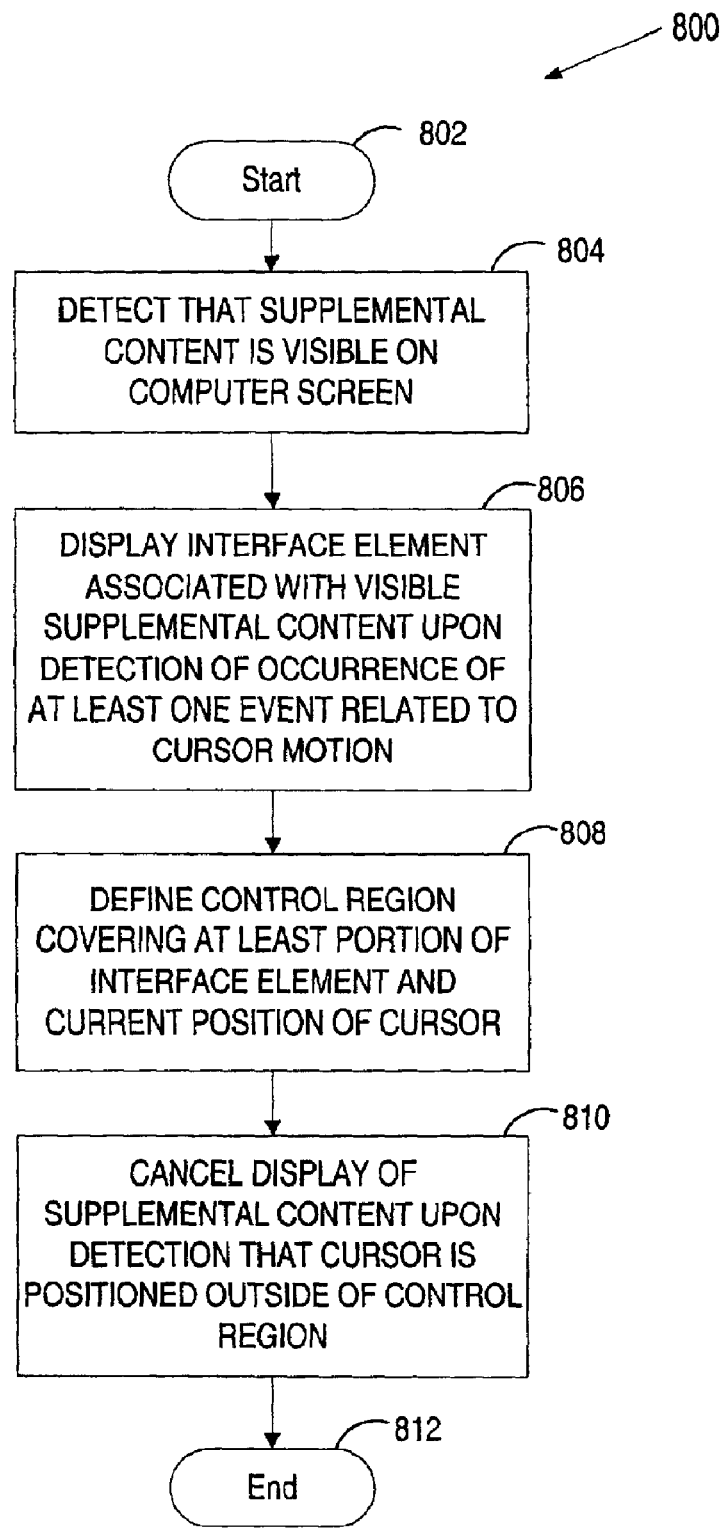
FIGS. 8A–8C are flowcharts of various embodiments of a method for controlling display of supplemental content.
Figure 8B:
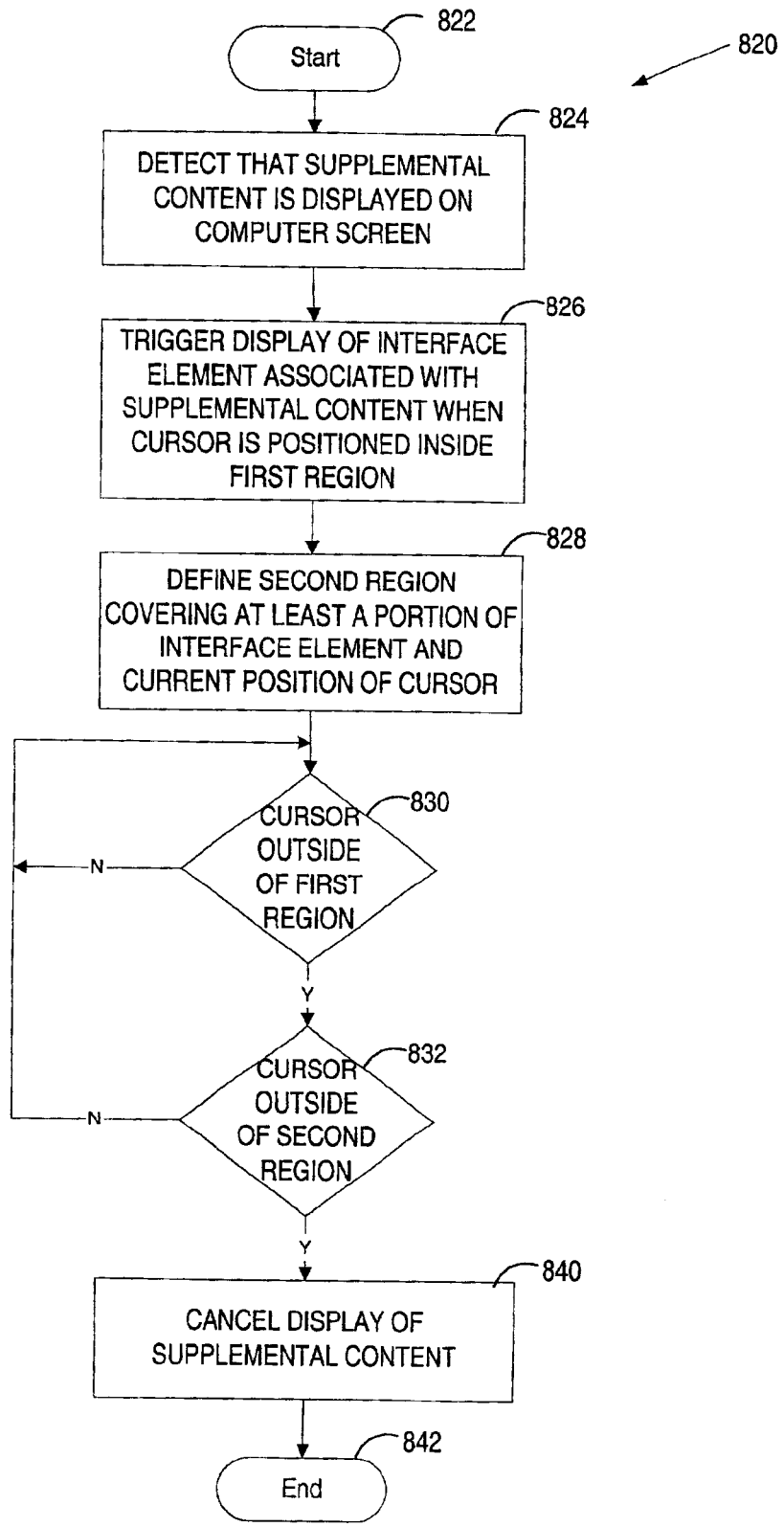
Figure 8C:
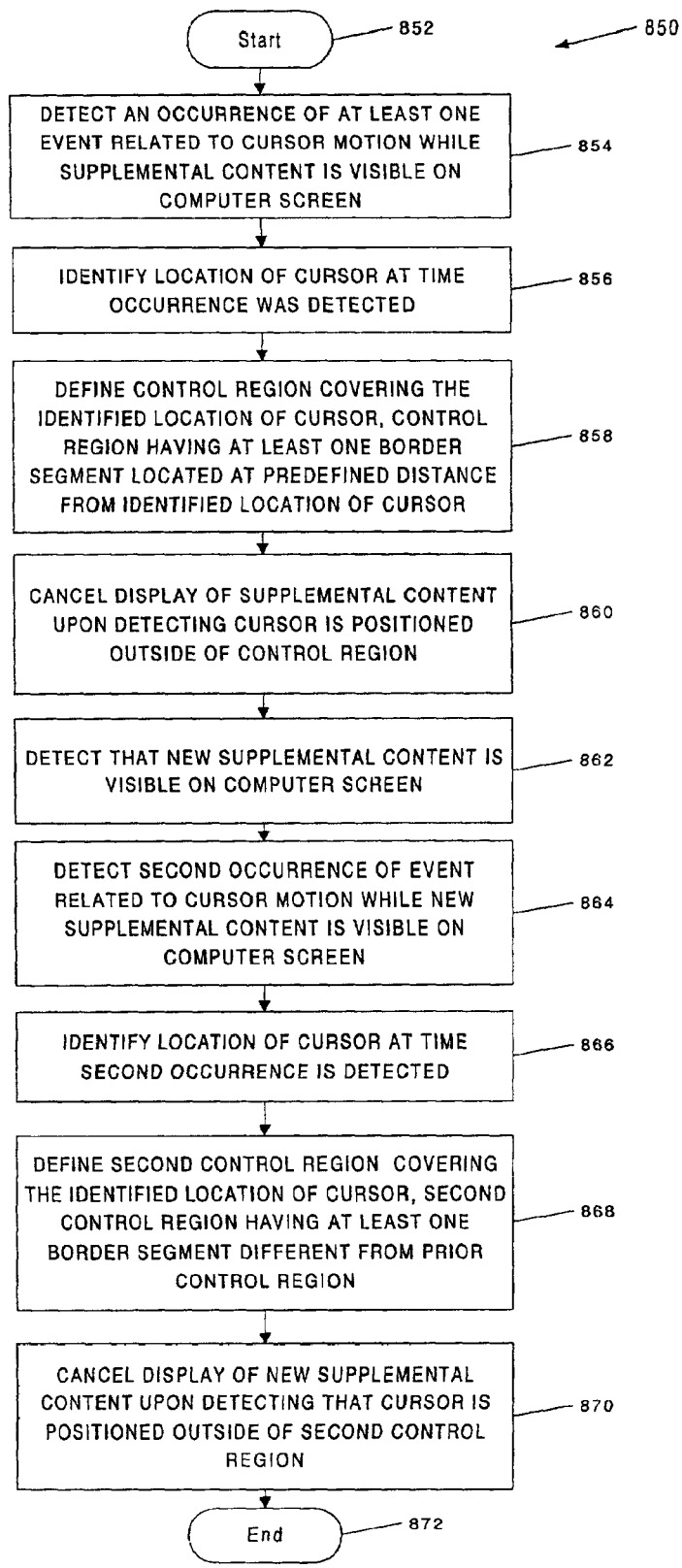

FIGS. 8A–8C are flowcharts of various embodiments of a method for controlling display of supplemental content.

Referring to FIG. 8A, method 800 begins with detecting that the supplemental content is visible on the computer screen (processing block 804). In one embodiment, the supplemental content is visible in a separate window (e.g., a pop-up window). At processing block 806, an interface element associated with the visible supplemental content is displayed upon detecting an occurrence of at least one event related to the cursor motion. Such event may represent a reduction in the cursor motion, an absence of the cursor motion for a predefined time interval, a particular movement of the cursor (e.g., a gesture to reproduce a circle), or any other similar event.

At processing block 808, a floating control region is defined that covers at least a portion of the interface element and the position of the cursor at the time of the detected event. In one embodiment, at least one border of the control region is visible. In one embodiment, the control region that covers the current position of the cursor can be defined after the occurrence of at least one event related to the cursor motion but before the interface element is displayed. In this embodiment, the interface element, which is at least partially covered by the control region, is displayed after the control region is defined.

In one embodiment, the display of the supplemental content can be modified upon detecting the user's selection of the interface element. The modification may include, for example, a change in the size of the area containing the supplemental content, a replacement of the main content with the supplemental content, etc.

At processing block 810, the display of the supplemental content is canceled upon detecting that the cursor is positioned outside of the control region. In addition, the control area and the interface elements are also removed from the screen.

Referring to FIG. 8B, method 820 begins with detecting that the supplemental content is displayed on the computer screen (processing block 824). The supplemental content becomes visible when the cursor is detected inside a predefined first region containing a main content portion related to the supplemental content. In one embodiment, the supplemental content is displayed as a tool tip.

At processing block 826, an interface element associated with the supplemental content is displayed when the cursor is positioned inside the first region. In one embodiment, the interface element is located at a predetermined offset from the current cursor position. At processing block 828, a second region is defined that covers at least a portion of the interface element and the current position of the cursor. As a result, the second region includes a portion of the first region and some area outside of the first region. In one embodiment, the second region can be defined when the cursor is positioned inside the first region but before the interface element is displayed. In this embodiment, the interface element, which is at least partially covered by the second region, is displayed after the second region is defined.

In one embodiment, the user's selection of the interface element triggers a change in the display of the supplemental content. For example, the size of the area containing the supplemental content may be expanded, and new interface elements may be displayed inside the expanded area to allow the user to scroll the supplemental content or request a replacement of the main content with the supplemental content.

At decision box 830, a determination is made as to whether the cursor is positioned outside of the first region. If the determination is negative, process flow returns to decision box 830. Alternatively, if the cursor is positioned outside of the first region, a further determination is made as to whether the cursor is positioned outside of the second region (decision box 832). If the determination is negative, process flow returns to decision box 830. Otherwise, if the cursor is detected outside of both the first region and the second region, the display of the supplemental content is cancelled, as well as the display of the interface element and the second region.

Referring now to FIG. 8C, method 850 begins with detecting an occurrence of at least one event related to a cursor motion while the supplemental content is visible on the computer screen (processing block 854). This event may represent a reduction in the cursor motion, an absence of the cursor motion for a predefined time interval, a particular movement of the cursor (e.g., a gesture to reproduce a circle), or any other similar event. At processing block 856, the cursor position is identified at the time of the occurrence. At processing block 858, a floating control region is defined that covers the identified location of the cursor. At least one border segment of the control region is located at a predefined distance from the identified location of the cursor. At processing block 860, the display of the supplemental content is canceled upon detecting that the cursor is positioned outside of the control region.

Next, at processing block 862, it is detected that new supplemental content is visible on the screen. While the new supplemental content remains visible, a second occurrence of an event related to the cursor motion is detected (processing block 864). Further, the location of the cursor at the time of the second occurrence is identified (processing block 866) and a second control region is defined that covers this new location of the cursor (processing block 868). At least one border segment of the second control region is located at the same distance from the new cursor position as a corresponding border of the prior control region. In the meantime, at least one border segment of the second control region differs from a corresponding border segment of the prior control region.

Afterwards, the display of the second supplemental content is canceled upon detecting that the cursor is positioned outside of the second control region (processing block 870).

In some embodiments, a set of actions, which include the display of the supplemental content, the detection of the event related to the cursor motion, the creation of the floating control region and the cancellation of the supplemental content display upon detecting the cursor outside of the control region, can occur three or more times during the user's with the same main documents.

Some embodiments of the present invention will now be described in more detail in conjunction with FIGS. 2, 3A, 3B and 4.

Referring again to FIG. 2, supplemental content is displayed in pop-up window 205 that overlaps main window 200 containing user-requested content in client area 215. In one embodiment, removal of the supplemental content is triggered after detecting reduction of the cursor motion. For instance, motion reduction is detected when cursor 230 stops inside client area 215 of the main document. Next, a floating control region 220 is determined, covering the cursor location where the motion reduction was detected and having at least one border segment depending on this location. In the embodiment illustrated in FIG. 2, control region 220 has a rectangular shape centered at the location of the paused cursor, with all border segments dependent on the cursor location at the time of motion reduction.

The removal of the supplemental content from the computer screen can be triggered by moving the cursor outside of the control region. In one embodiment, control region 220 has visible borders and contains an interface element 225. When the cursor is found outside of control region 220, its borders and content become invisible. Accordingly, a single move out of control region 220 restores free access to the areas of the main content previously covered by both supplemental content and control region 220. However, this additional method of removing the supplemental content does not preclude the user from employing such conventional methods as closing pop-up window 205 by selecting a close button 210 if the control region around the cursor is not present, or pressing "Alt" and "F4" keys when pop-up window 205 is in the foreground.

After the supplemental content and control region 220 are removed from the screen, new supplemental content can be displayed (e.g., resulting from the execution of the JavaScript program embedded into the main content). In one embodiment, a reduction in the cursor motion while the new supplemental content is visible triggers display of a corresponding control region around the new cursor location. If the new cursor location is different from the cursor location associated with control region 220, the new control region will have at least one border segment different from the border segment of control region 220.

In some embodiments, in order to enable interaction with the supplemental content, an interface element is displayed after the motion reduction is detected. The control region covers at least a portion of this interface element to allow user interaction without triggering removal of the supplemental content. In the embodiment illustrated in FIG. 2, the interface element rendered inside the control region 220 is a link 225 related to the supplemental content. In this embodiment, the user can select interface element 225 by releasing a button of the pointing device inside control region 220. As a result, window 205 with supplemental content disappears from the screen, and the main content in client area 215 is replaced by the supplemental content. In addition, control region 220 becomes invisible, and the user can start navigating the new content using all interface elements of main window 200.

In the embodiment shown in FIG. 2, link 225 related to the supplemental content is rendered as an indicator that the main content can be replaced by clicking inside control region 220. In this way, the user is provided with a familiar metaphor of a tool tip, where pop-up window 205 starts behaving as a tool tip in relation to link 225 located inside the control region 220. That is, a control region surrounds a link while the associated content is displayed, and a cursor motion outside of the control region causes removal of the associated content. In addition, a click on the link inside the region makes the main content disappear, as if it were a regular link inside the hypertext document. Accordingly, the prior-art approach to the relationship between the link and related supplemental content is reversed while familiar interface metaphors are kept. That is, instead of displaying supplemental content after the cursor stops in the control region of the link, the link and its control region are displayed after the supplemental content becomes visible, and the location of the link depends on the cursor position at the time the motion reduction was detected.

In other embodiments, the interface element supports actions other than replacement of the main content. In addition, the image of the interface element may change with the supplemental content or remain the same for different instances of the supplemental content.

If no interaction with the supplemental content of pop-window 205 is required, the area inside control region 220 may be left transparent instead of having link 225 or any other interface element. For example, a pop-up window may contain an advertisement without any links to another documents. In this example, the pop-up window can be easily removed by moving the cursor outside of the empty control region with visible borders.

Reduction of the cursor motion that triggers the appearance of the control region can be detected, for instance, by monitoring the cursor speed or the shift of the cursor position during a pre-defined time interval. Threshold values of the change in the cursor position and duration of the time interval can vary according to the screen resolution, characteristics of the pointing device, or user preferences. To prevent display of a control region during active navigation, it is recommended to trigger the display of the control region only if the shift of the cursor position is less than 50 pixels during the time interval larger than 0.05 second.

In some embodiments, the control region is displayed if an extra condition (in addition to detection of the reduced cursor motion) is satisfied. For example, the control region may be displayed only if the cursor has paused outside of the display area of the supplemental content (e.g., pop-up window 205). In this way, a pop-up window cannot be accidentally removed from the screen if the user moved the cursor inside the pop-up window and intends to navigate its content. In another example, the control region is displayed only if the cursor has paused outside of any interface element associated with a tool tip. In this example, a pause in any area free of interface elements or links will cause display of the control region. In addition, according to the prior art, a pause on the link inside the main content will trigger display of a corresponding tool tip.

In some embodiments, the control region used to trigger removal of the supplemental content is defined only if the presented supplemental content satisfies at least one predefined condition. For example, the control region may be defined only if the cursor motion reduction is detected after retrieval of the supplemental content over the computer network is finished. In this way, the supplemental content cannot be accidentally removed from the screen before the supplemental content is fully presented. In another example, the control region is defined and the interface element is displayed only if the supplemental content represents a predefined content type (e.g., an advertisement, a message sent to the user over the computer network such as an unsolicited email, or a non-urgent message generated by the user's computer such as a notification of the scheduled maintenance, or any other type defined by the content provider or configured by the user). As a result, it is easier for the user to remove less relevant supplemental content, while keeping more relevant supplemental content visible. In yet another example, the control region and the interface element are displayed only if the window containing the supplemental content is a child of the window containing the cursor location at the time the motion reduction is detected. As a result, the pop-up windows automatically generated by the program embedded into the main content can be easily removed, while keeping all other windows visible on the screen.

As described above, the display of the control region around the current cursor position serves as an indication that the supplemental content can be removed by changing the cursor position. However, the user's attention is not always concentrated on the area around the cursor. In addition, the borders of the control region may be invisible or not easily recognizable within some types of the main content. Furthermore, multiple instances of the supplemental content may be visible at the same time, making it harder to identify which one is associated with the current control region. In one embodiment, in such situations, the appearance of at least one area inside the display region of the supplemental content is changed after the cursor is paused and the control region is set. For instance, once the control region and the interface element become visible around the cursor, the background color of the title bar of the pop-up window may change from blue to red or a warning may appear in the title bar.

Once the supplemental content is removed, the previously overlapped areas of the main content are uncovered, restoring full visual and navigational access to the region displaying the main content. In one embodiment, this is accomplished by closing the pop-up window with supplemental content. In another embodiment, the pop-up window with supplemental content is moved into the background and can be recalled by the user at a later time.

Some embodiments are directed to improving interaction with the supplemental content that is already sensitive to the cursor motion. Referring to FIG. 3A, supplemental content 315 relates to link 325 included in a predefined content control region 320 and is sensitive to a cursor motion relative to content control region 320, i.e., supplemental content 315 becomes visible when the cursor is positioned inside content control region 320. In addition, according to the prior art, supplemental content becomes invisible when the cursor is positioned outside of content control region 320, thus making it impossible to interact with supplemental content 315. The present invention changes this prior art approach.

In one embodiment, when the cursor is paused at location 330 inside content control region 320, interface element 345 is displayed near location 330. Interface element 345 is provided to allow the user to alter the display supplemental content 315. In one embodiment, interface element 345 is displayed outside of location 330 to avoid obscuring the document area on which the user is currently focused. Next, a control region 335 is identified to cover cursor position 330 and interface element 345. Alternatively, interface element 345 can be displayed inside control region 335 after it is identified. Such a control region, identified after the cursor is found inside the pre-defined content control region and covering at least a portion of the interface element, is thereafter referred to as an interface access region. In the illustrated embodiment, the borders of the interface access region 335 are shown by dashed lines to indicate the range of the cursor motion that would not trigger the removal of supplemental content 315. Supplemental content 315 also remains visible while the cursor is positioned inside content control region 320 as supported by the prior art. The removal of supplemental content 315 occurs when the cursor is detected outside of both regions: content control region 320 and interface access region 335. As a result, the user can move the cursor to position 340 over interface element 345 without triggering the removal of supplemental content 315, even if position 340 is outside of content control region 325.

Further, the cursor can also be moved outside of interface access region 335 while remaining inside content control region 320, without triggering the removal of supplemental content 315. In one embodiment, such move invalidates interface access region 335 and cancels the display of its borders and interface element 340. Subsequently, if the cursor stops at a different position inside content control region 320, the interface access region can be set at a new location and a new interface element can be displayed, as illustrated in FIG. 3B.

Figure 3B:
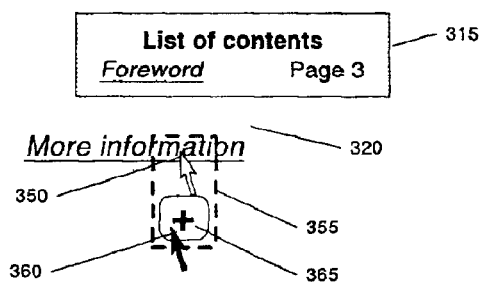

Referring to FIG. 3B, when the cursor stops at a new position 350, a new interface element 365 is displayed, and borders of a new interface access region 355 appear, while the same supplemental content 315 remains visible. The image of interface element 365, its offset from the cursor position 350, the shape of interface access region 355 and the location of interface access region 355 relative to cursor position 350 remain the same as corresponding parameters associated with the prior cursor position 330. If the cursor has been moved to position 340 after the interface access region has shifted to location 355, supplemental content 315 is removed from the screen because position 340 is now outside of both content control region 320 and new interface access region 355. However, because the position of the interface element has also changed from 345 to 365, the user can select the interface element by moving the cursor to position 360, without triggering the removal of supplemental content from the screen. A floating interface element, which has the same shape and is displayed at the constant offset from the paused cursor, allows the user to employ a motion of the same amplitude and direction to select this element, helping to form a kinesthetic memory that makes interaction less distractive. Also, a close placement of the interface element to the current cursor position decreases the time required to select the interface element, even if the interface element occupies a small area on the screen.

As described above, the display of the interface element may be canceled if the cursor moves outside of the interface access region. In some embodiments, this display may also be canceled when the supplemental content is removed from the screen, even if the cursor remains inside the interface access region. For instance, the supplemental content can be removed if the cursor stays inside the content control region longer than a predefined time interval, indicating the lack of the user activity. In one embodiment, removal of the supplemental content cannot be triggered by the timeout during a predefined time interval following the display of the interface element. The predefined time interval has to be longer than 0.05 second to give the user an opportunity to select the interface element while the supplemental content is visible. More time may be required to select an interface element located further away from the cursor location.

Some prior art techniques can control the supplemental content by a cursor motion, without establishing a content control region. For instance, the removal of supplemental content from the screen can be triggered by moving the cursor with a speed exceeding a predefined threshold. In one embodiment, presence of the visible interface element modifies the prior art behavior by suppressing the removal of the supplemental content while the cursor remains inside of the interface access region. In one embodiment, the removal of the supplemental content is also suppressed while the interface element is visible. In this embodiment, the supplemental content may become visible either before or after the interface element, as long as there is a time period when both of them are visible.

In one embodiment, the interface element is used to alter the display of the supplemental content. First, the cursor is moved to the location of the interface element while remaining inside the interface access region. After that, the user can perform an action indicating how the display of the supplemental content needs to be changed. In one embodiment, the display of the interface element is canceled when such action is detected, even if the supplemental content remains visible on the screen. A change in the supplemental content display can be triggered, for instance, by releasing a button of the pointing device while keeping the cursor inside the interface element. Alternatively, a change in the display can also be triggered if the cursor remains inside the interface element for a predefined time, usually larger than 0.05 second. This method is recommended if after the change in the display, the supplemental content can still be removed by a cursor motion, to decrease penalty for the unintended action.

Figure 4:
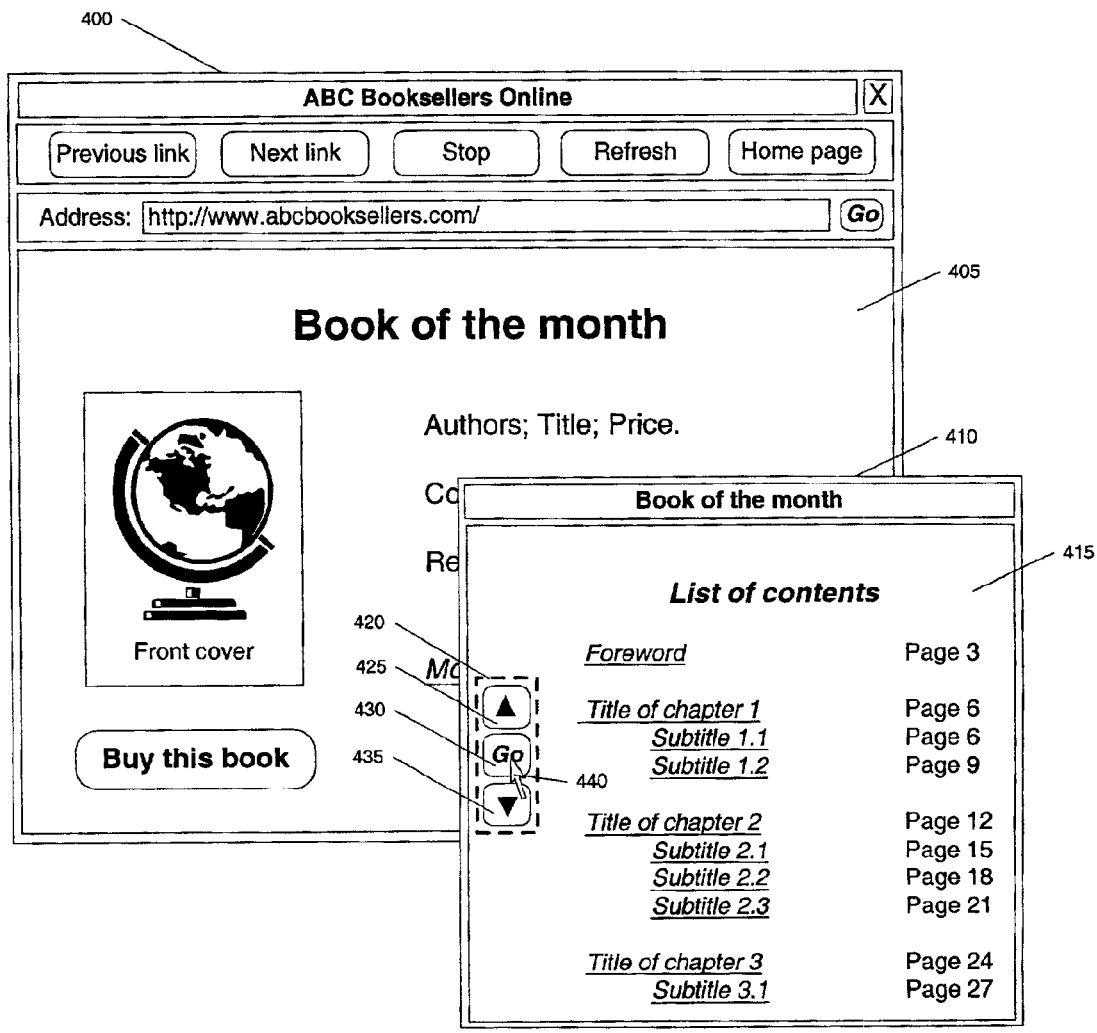

In one embodiment, the user action inside the interface element causes an increase of the size of the region containing the supplemental content, as illustrated in FIG. 4. Referring to FIG. 4, when the cursor stops inside the interface element, the display region of the supplemental content increases in size to a client area 415 of a window 410, covering significant part of the main content. In the displayed embodiment, larger area 415 includes image elements previously presented in the smaller area 315 (header and the first entry). In other embodiments, an enlarged display area may contain supplemental content different from the one displayed in the small display area, as long as the two contents are related.

In one embodiment, when the cursor's pause inside interface element 365 triggers an expansion of the display region, the display of interface element 365 and interface access region 355 is canceled. Next, when a new reduction of the cursor motion is detected at location 440, a new interface access region 420 is defined around location 440, and interface elements 425, 430 and 435 are rendered inside interface access region 420. As shown in FIG. 4, interface access region 420 is located inside display area 415. Alternatively, it can be located outside of that area, for instance, in the display area 405 not covered by the window 410. In one embodiment, more than one interface element is available for selection inside region 420. In this embodiment, each interface element can be used to perform a separate action related to the supplemental content. For instance, a stop inside interface element 425 or 435 will cause scrolling of the supplemental content inside window 410 in the direction indicated by an arrow. To increase the scroll speed, the user can press a button of the pointing device while keeping the cursor inside interface element 425 or 435. When scrolling is triggered, interface elements 425 through 435 and interface access region 420 do not disappear and remain in the same position on the screen during the scrolling.

The release of the pointing device button when the cursor is positioned inside interface element 430 triggers the replacement of the main content in window 400 with the supplemental content from window 410 and the removal of window 410, control region 420 and interface elements 425 through 435.

When the cursor is moved outside of region 420, interface elements 425, 430 and 435, as well as the supplemental content and region 420, are removed from the screen.

Figure 5A:
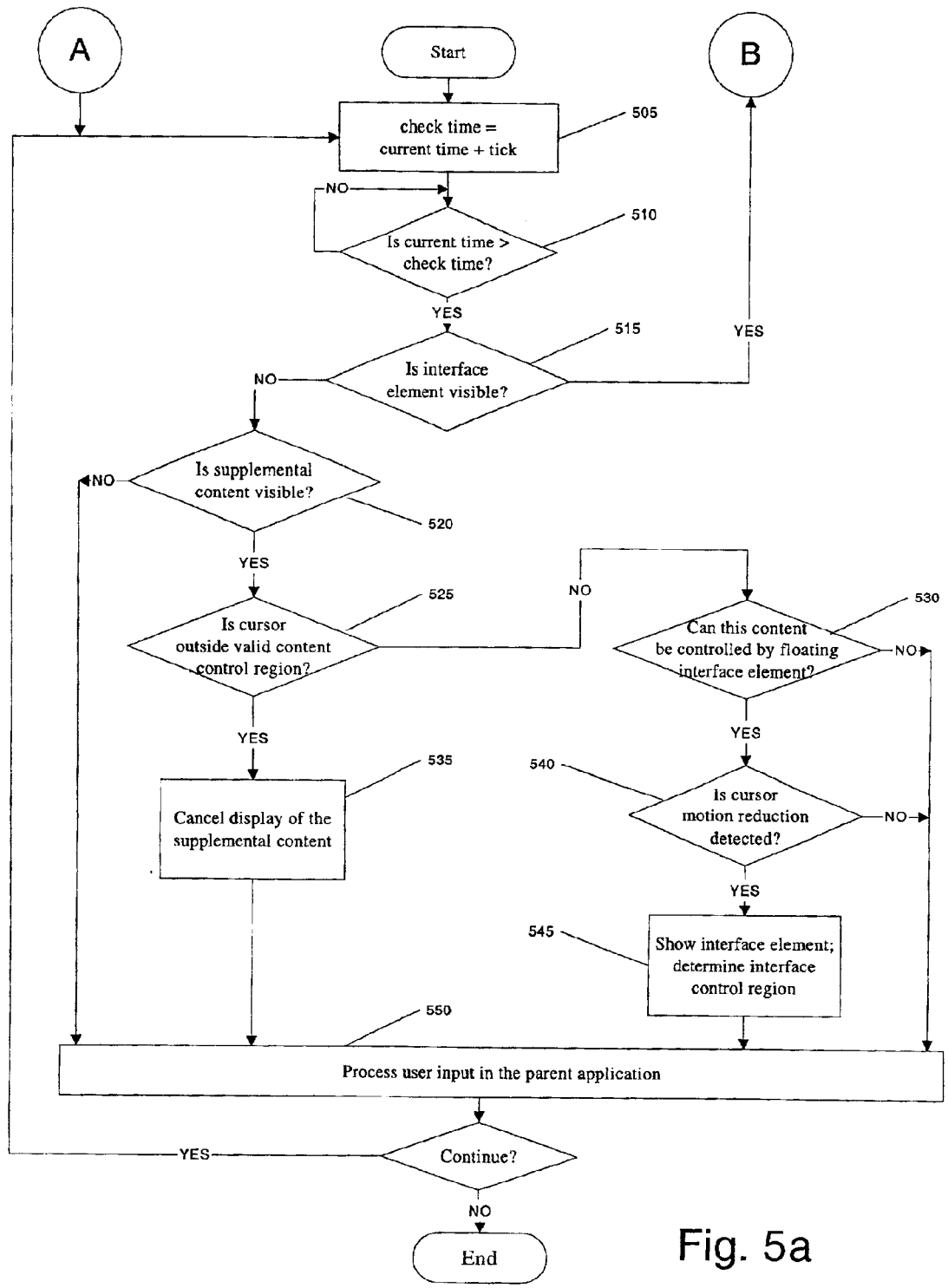
FIGS. 5A and 5B illustrate a flow diagram for a method of controlling supplemental content displayed on a computer screen, according to one embodiment of the present invention.
Figure 5B:
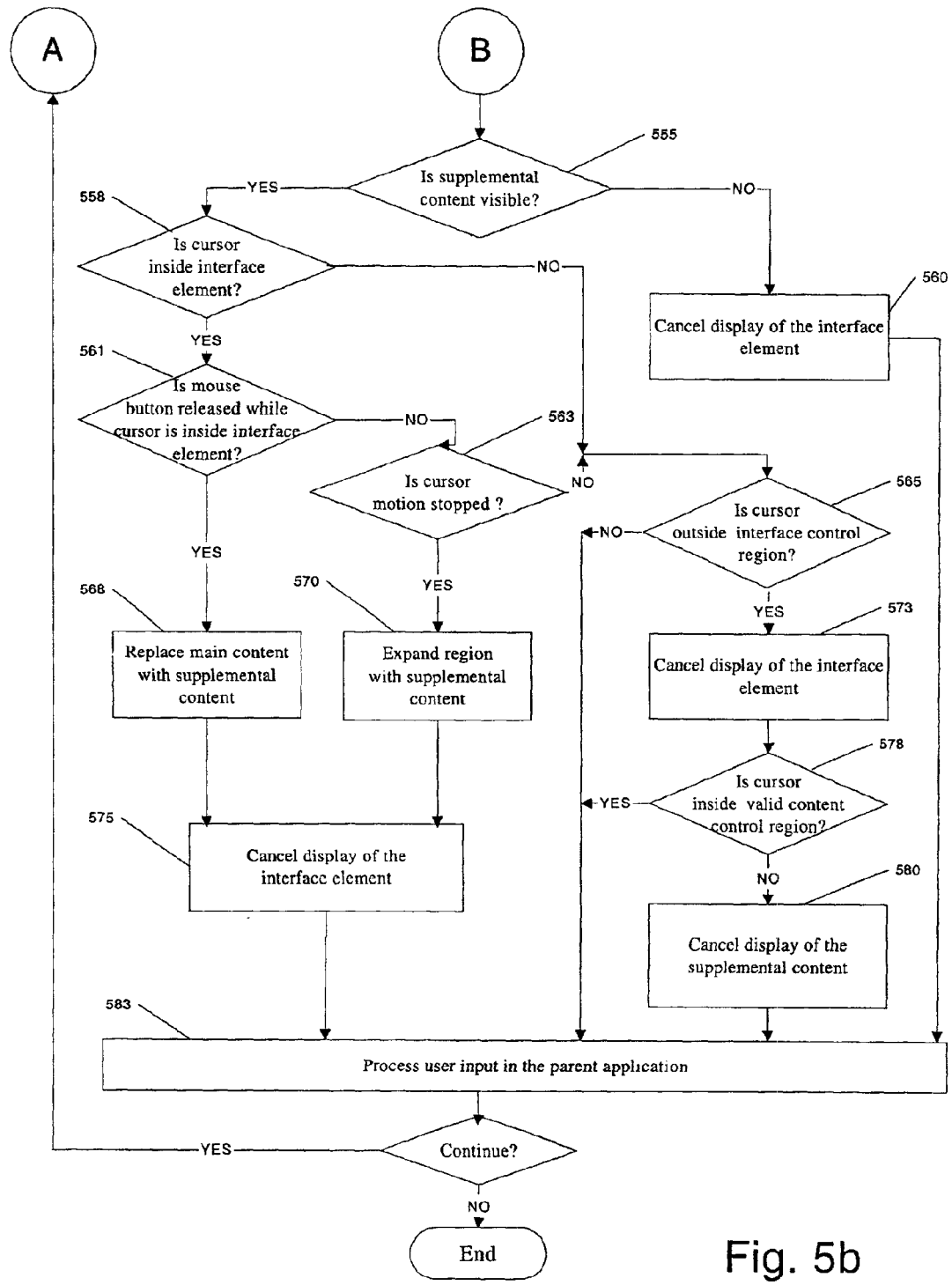

FIG. 5 is a flow diagram for a method of controlling supplemental content displayed on a computer screen, according to one embodiment of the present invention. Processing is performed once per pre-defined time interval. The start of each cycle is controlled by blocks 505 and 510. Processing starts by checking the visibility of an interface element (block 515) and the visibility of supplemental content (blocks 520 and 555). If the supplemental content is invisible, the processing is transferred to the parent application (blocks 550 and 583); if interface element was visible, its display is canceled (block 560).

Supplemental content referred to in FIG. 5 may or may not have an associated valid control region and may be displayed when the current document is loaded, or in response to the cursor's motion. The process of displaying supplemental content is performed in accordance with a prior art embodiment (e.g., prior art embodiment described in reference to FIG. 1) and is not illustrated in FIG. 5.

If the supplemental content is visible, but the interface element is not visible, block 525 checks if the cursor is outside of the valid content control region. If the valid content control region exists and the cursor is found outside of this region, the display of the supplemental content is canceled (block 535). If there is no valid control region associated with the supplemental content, or the cursor is inside the valid region, the supplemental content is checked for a predefined condition that allows the supplemental content to be controlled by the floating interface element (block 530). For instance, such condition could be a requirement that the supplemental content contain an advertisement recognized by the special tag in the HTML document. If this condition is satisfied and the cursor motion reduction is detected (block 540), block 545 defines an interface access region and displays the interface element. Otherwise, control is transferred to the parent application (block 550) without displaying the interface element.

Removal of the supplemental content that does not have a valid content control region is not described in FIG. 5 and is accomplished in accordance with the prior art.

If both the interface element and supplemental content are visible, block 558 checks if the cursor is inside the interface element, so that this interface element can be selected to alter its content display. If the check is positive and the button of the pointing device is released while the cursor is positioned inside the interface element (block 561), the main content is replaced with the supplemental content (block 568). Alternatively, if the mouse button is not released but the cursor has paused inside the interface element (block 563), block 570 expands the region containing the supplemental content. In both cases, the display of the interface element is canceled (block 575).

If the cursor is outside of the interface element, or the user's intention to alter the content display is not detected, block 565 tests if the cursor is outside of the interface access region. If this condition is true, the display of the interface element is canceled (block 573). If the cursor is outside of the valid content control region or such region is not defined (as checked in the block 578), while the cursor is outside of the interface access region, block 580 cancels the display of the supplemental content. It is not necessary at this stage to check if the content can be removed by the interaction with the interface element, because block 530 makes sure that the interface element is displayed only for the appropriate content. If the content control region is valid and the cursor is found inside this region, or if the cursor is located inside the interface access region, the display of the supplemental content continues while control is transferred to the parent application, such as an Internet browser.

Figure 6:
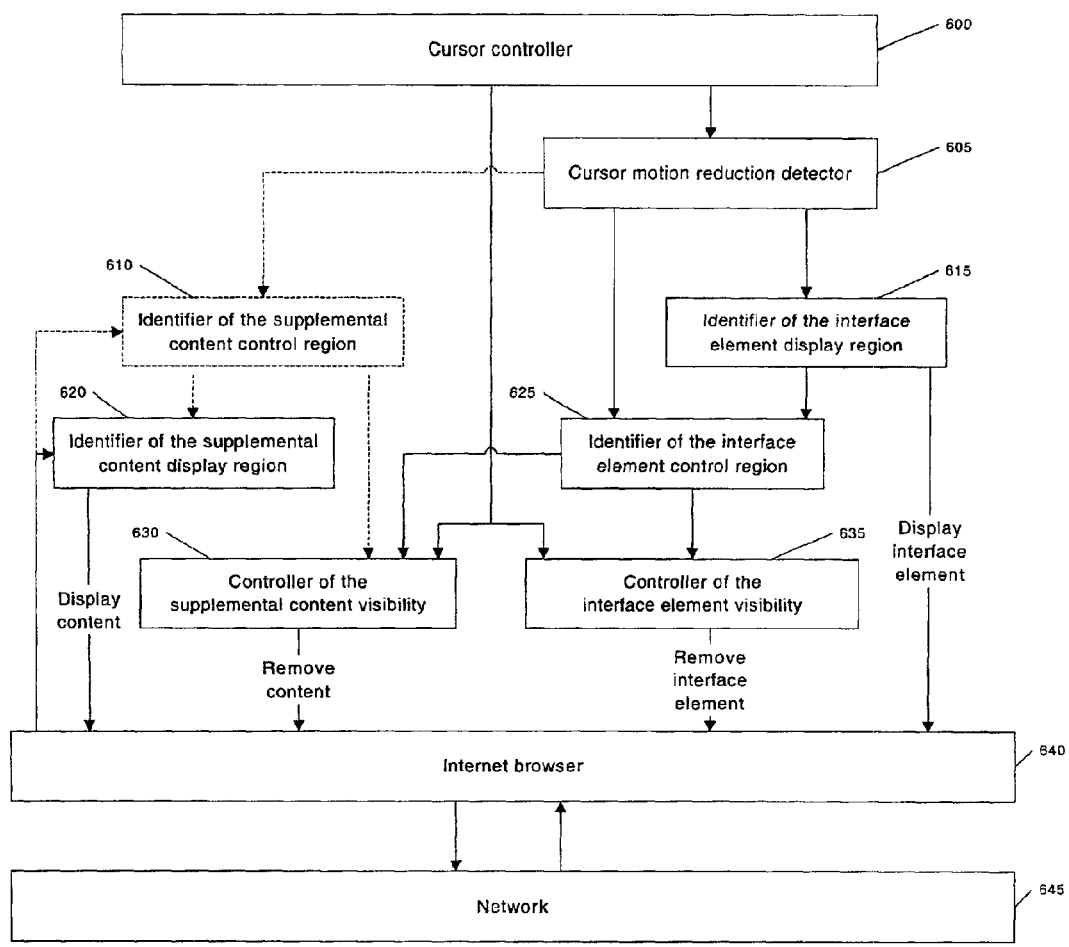
FIG. 6 is a block-diagram of an embodiment of the computer subsystem implementing the present invention.

FIG. 6 illustrates one embodiment of a computer subsystem implementing the present invention. Referring to FIG. 6, Internet browser 640 performs all rendering operations, retrieving content from network 645. Cursor controller 600 controls the user's interaction with the content. Detector 605 of the cursor motion reduction receives the current cursor position from cursor motion controller 600 and sends a signal to identifier 615 of the interface element display region, triggering a display of the interface element, and to identifier 625 of the interface element access region. A signal from detector 605 is sent only when a motion reduction is detected, and contains the cursor location at the time of this detection.

Identifier 615 of the interface element display region requests Internet browser 640 to display the interface element at a predefined offset from the current cursor position and notifies identifier 625 of the interface element access region where the interface element is displayed. Module 625 defines the location of the interface element access region, covering both the current cursor position and at least a portion of the interface element, and communicates this location to controller 630 of the supplemental content visibility and controller 635 of the interface element visibility. Both controllers receive continuous updates of the cursor position from cursor controller 600 and compare them with the location of the interface access region. If the cursor is found outside of the interface access region, module 635 issues a request to remove the image of the interface element from the computer screen.

In one embodiment, module 620 displays the supplemental content under the control of Internet browser 640 without setting a content control region. In this case, module 630 issues a request to remove an image of the content from the computer screen as soon as the cursor is found outside of the interface element access region.

In another embodiment, the computer subsystem also includes an identifier 610 of the content display region that finds the content control region by comparing the signal from motion reduction detector 605 with the available set of content control regions provided by Internet browser 640. If a motion reduction is detected while the cursor is inside the valid content control region, the supplemental content is displayed by Internet browser 640 and the location of the content control region is sent to content visibility controller 630. In this embodiment, module 630 issues a signal to remove an image of the supplemental content only if the cursor is found outside of the content control region. If the location of the valid interface element access region is communicated to the content visibility controller by module 625, a signal to remove the content image is issued if the cursor is also found outside of the interface element access region.

Other embodiments of a computer subsystem implementing the present invention may contain more or less modules than the embodiment subsystem presented in FIG. 6.

Figure 9:
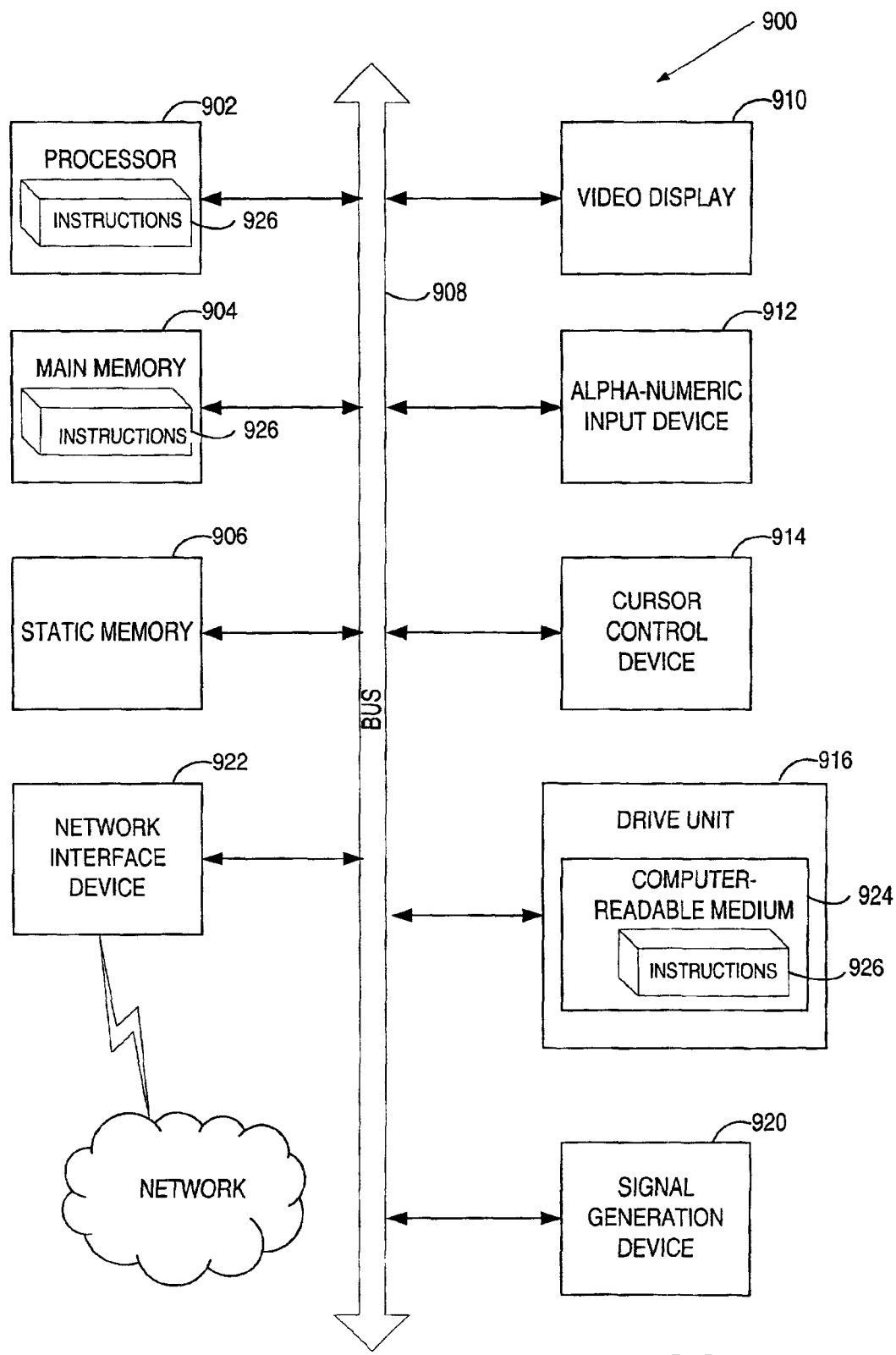
FIG. 9 is a block diagram of one embodiment of a computer system implementing the present invention.

FIG. 9 shows a diagrammatic representation of machine in the exemplary form of a computer system 900 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 900 includes a processor 902, a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alpha-numeric input device 912 (e.g., a keyboard), a cursor control device 914 (e.g., a mouse), a disk drive unit 916, a signal generation device 920 (e.g., a speaker) and a network interface device 922.

The disk drive unit 916 includes a computer-readable medium 924 on which is stored a set of instructions (i.e., software) 926 embodying any one, or all, of the methodologies described above. The software 926 is also shown to reside, completely or at least partially, within the main memory 904 and/or within the processor 902. The software 926 may further be transmitted or received via the network interface device 922. For the purposes of this specification, the tern "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories, optical and magnetic disks, and carrier wave signals.

Although the present invention has been described with reference to specific embodiments, various modifications and changes could be made to these embodiments without departing from the broader spirit and scope of the invention. For instance, applications other than the Internet browser can be used to display supplemental content controlled by the cursor's motion, e.g., applications such as a word processor, an image processor or a spreadsheet could present extended help files or suggested content modifications that can be removed by moving the cursor out of the control region appearing after the cursor motion reduction is detected. Also, the main content and the supplemental content may be displayed using different applications, e.g., the main content may be displayed by a word processor while the supplemental content may be displayed by an Instant Messenger, where Instant Messenger windows can be removed according to the present invention while navigating the document inside the word processor. Alternatively, supplemental content over any application can be generated by an operating system or by a computational process running on the background, e.g., a message in a non-modal dialog box informing the user about the change in the state of the application or the operating system.

Next, the supplemental content does not need to overlap the main content to be controlled by the cursor motion inside the main content. Also, the content removal can be controlled according to the present invention even if the motion reduction is detected while the cursor is outside of any other content, e.g., if cursor has stopped in the empty area of the desktop.

Display region of the content controlled by the cursor motion according to the present invention can have one of many different shapes, dynamically changing with time. For instance, such content may contain a video image of a person over a transparent background, or an image of a moving 3 D object.

Display of the interface element can be triggered by events different from the cursor motion reduction, such as pressing a button on the pointing device or a key on the keyboard, as long as the cursor remains within the interface access region during this display.

The content controlled by the cursor motion can be displayed on the screen using various means depending on hardware capabilities, an application and an operating system. For instance, it can be presented in a separate window, or as a separate layer of the hypertext document according to the DHTML specification, or as a video overlay stored in a separate rendering surface.

A cursor motion that causes removal of the content from the computer screen does not have to be continuous. If a computing system with a touch screen is used, for instance a hand-held device such as a personal digital assistant (PDA), the touch of the screen outside of the floating content control region may cause removal of the content from the screen.

Accordingly, the specification and drawings are to be regarded in an illustrative rather than a restrictive sense, while conformance to the present invention is evaluated solely based on the following claims.

What is claimed is:

1. A method for controlling display of supplemental content on a computer screen, the method comprising:
    detecting that the supplemental content is displayed on the computer screen, the display of the supplemental content being controlled by a cursor position relative to a predefined first region;
    triggering display of an interface element associated with the supplemental content when a cursor is positioned inside the first region;
    defining a second region covering at least a portion of the interface element and a current position of the cursor; and
    if the cursor is positioned inside the second region, continuing the display of the supplemental content upon detecting that the cursor is positioned outside of the first region.

2. The method of claim 1 wherein the supplemental content is related to content displayed in the first region.

3. The method of claim 2 wherein the supplemental content is a tool tip.

4. The method of claim 1 wherein the display of the supplemental content is triggered by positioning the cursor inside the first region.

5. The method of claim 1 further comprising:
    removing the supplemental content from the computer screen upon determining that the cursor is positioned inside the second control region while being outside of the first region for a time period exceeding a predefined time period.

6. The method of claim 1 further comprising:
    displaying borders of the second region when the second region is defined; and
    canceling the display of the borders upon detecting the motion of the cursor outside of the second region.

7. The method of claim 1 wherein:
    the interface element includes at least two components, and
    the second region covers at least a portion of each of the at least two components.

8. The method of claim 1 further comprising:
    canceling the display of the interface element upon detecting that the cursor is positioned outside of the second region.

9. The method of claim 1 wherein the interface element is displayed at a predefined offset from the current position of the cursor.

10. The method of claim 9 further comprising:
    canceling the display of the interface element upon detecting that the cursor is positioned outside of the second region while remaining within the first region;
    detecting that the cursor is moved to a new position within the first region while the supplemental content remains visible; and
    displaying the interface element at the predefined offset from the new position of the cursor.

11. The method of claim 1 further comprising:
    altering the display of the supplemental content upon detecting a user action pertaining to the interface element.

12. The method of claim 11 further comprising:
    canceling the display of the interface element when the user action is detected.

13. The method of claim 11 wherein altering the display of the supplemental action comprises altering the size of an area displaying the supplemental content.

14. The method of claim 11 wherein altering the display of the supplemental content comprises scrolling through the supplemental document.

15. The method of claim 11 wherein the user action comprises pausing the cursor over the interface element for a predefined time period.

16. A method for controlling display of supplemental content on a computer screen, the method comprising:
    detecting that the supplemental content is visible on the computer screen;
    refraining from displaying an interface element until a cursor is detected outside of a computer screen area in which the supplemental content is displayed;
    displaying the interface element associated with the visible supplemental content upon detecting an occurrence of at least one event related to a cursor motion;
    defining a control region covering at least a portion of the interface element and a current position of the cursor; and
    canceling the display of the supplemental content upon detecting that the cursor is positioned outside of the control region.

17. The method of claim 16 wherein the supplemental content is displayed in a separate window.

18. The method of claim 16 wherein detecting the occurrence of at least one event related to the cursor motion includes detecting that a change in a cursor position has been below a predefined threshold over a predetermined time interval.

19. The method of claim 18 wherein:
the predetermined time interval is larger than 0.05 second; and
the predefined threshold is less than fifty pixels.

20. The method of claim 16 wherein detecting the occurrence of at least one event related to the cursor motion includes detecting the absence of the cursor motion over a predetermined time interval.

21. The method of claim 16 further comprising:
refraining from displaying the interface element until the cursor is detected outside of any visible interface element associated with a tool tip.

22. The method of claim 16 further comprising:
refraining from canceling the display of the supplemental content until the display of the interface element continues for a predefined time period.

23. The method of claim 16 further comprising:
canceling the display of the interface element upon detecting that the cursor is positioned outside of the control region.

24. The method of claim 16 wherein canceling the display of the supplemental content includes covering at least a portion of supplemental content with different content.

25. The method of claim 16 wherein canceling the display of the supplemental content includes closing a window containing the supplemental content.

26. The method of claim 16 further comprising:
determining that the supplemental content satisfies at least one requirement prior to displaying the interface element.

27. The method of claim 26 wherein at least one requirement includes any one of a requirement that the retrieval of the supplemental content over a computer network be completed, a requirement that the supplemental content be an advertisement, a requirement that the supplemental content be a message sent to a user over the computer network, a requirement that the supplemental content be a message generated by a user computer, and a requirement that the window containing the supplemental content be a child of a window containing the current position of the cursor.

28. The method of claim 16 further comprising:
detecting that the cursor is positioned over the interface element while the supplemental content is visible;
detecting a predefined user action pertaining to the interface element while the cursor is positioned over the interface element; and
altering the display of the supplemental content upon detecting the predefined user action.

29. The method of claim 28 wherein altering the display comprises altering the size of a window containing the supplemental content.

30. The method of claim 28 wherein altering the display comprises:
closing a first window containing the supplemental content, and
displaying the supplemental content in a second window.

31. The method of claim 28 wherein the predefined user action comprises pausing the cursor over the interface element over a predefined time interval.

32. The method of claim 28 wherein the predefined user action comprises releasing a button of the pointing device while the cursor is positioned over the interface element.

33. The method of claim 16 wherein the interface element includes a link associated with the supplemental content.

34. A method for controlling display of supplemental content on a computer screen, the method comprising:
detecting that the supplemental content is visible in a separate window on the computer screen;
displaying an interface element associated with the visible supplemental content upon detecting an occurrence of at least one event related to a cursor motion;
defining a control region covering at least a portion of the interface element and a current position of the cursor;
canceling the display of the supplemental content upon detecting that the cursor is positioned outside of the control region; and
after defining the control region, changing appearance of at least a portion of the separate window to indicate that the removal of the supplemental content can be triggered by detecting the cursor outside of the control region.

35. A method for controlling display of supplemental content on a computer screen, the method comprising:
detecting an occurrence of at least one event related to a cursor motion while first supplemental content is visible in a separate window on the computer screen;
identifying a position of the cursor at the time the occurrence was detected;
defining a control region covering the identified position of the cursor, the control region having at least one border segment located at a predefined distance from the identified position of the cursor;
canceling the display of the first supplemental content upon detecting that the cursor is positioned outside of the control region;
detecting display of second supplemental content after canceling the display of the first supplemental content;
detecting a second occurrence of at least one event related to the cursor motion while the second supplemental content is visible on the computer screen;
identifying a second position of the cursor at the time the second occurrence was detected;
defining a second control region covering the second position of the cursor, the second control region having at least one border segment that is different from a corresponding border segment of the control region associated with the first supplemental content; and
canceling the display of the second supplemental content upon detecting that the cursor is positioned outside of the second control region.

36. The method of claim 35 wherein at least one border segment of the second control region is located at the same distance from the second cursor position as the corresponding border segment of the control region associated with the first supplemental content is located in relation to the prior cursor position.

37. The method of claim 36 wherein the second control region has the same shape and the same offset from the cursor position as the control region associated with the first supplemental content.

38. The method of claim 35 wherein the second control region has at least one border segment that is the same as a border segment of the control region associated with the first supplemental content.

39. The method of claim 35 wherein detecting the occurrence of at least one event related to the cursor motion includes detecting that a change in a cursor position has been below a predefined threshold over a predetermined time interval.

40. The method of claim 35 further comprising:
displaying at least one border segment of the control region upon defining the control region; and canceling the display of the at least one border segment upon detecting that the cursor is positioned outside of the control region.

41. A method for controlling display of supplemental content on a computer screen, the method comprising:
   detecting an occurrence of at least one event related to a cursor motion while the supplemental content is visible on the computer screen, wherein detecting the occurrence of at least one event related to the cursor motion includes detecting the absence of the cursor motion over a predetermined time interval;
   identifying a position of the cursor at the time the occurrence was detected;
   defining a control region covering the identified position of the cursor, the control region having at least one border segment located at a predefined distance from the identified position of the cursor; and
   canceling the display of the supplemental content upon detecting that the cursor is positioned outside of the control region.

42. An apparatus to control display of supplemental content on a computer screen, the apparatus comprising:
   a content detector to detect whether the supplemental content is displayed on the computer screen, the display of the supplemental content being controlled by a cursor position relative to a predefined first region;
   an interface element controller to trigger display of an interface element associated with the supplemental content when a cursor is positioned inside the first region;
   a control region identifier to define a second region covering at least a portion of the interface element and a current position of the cursor; and
   a content removal controller to continue the display of the supplemental content when the cursor is positioned outside of the first region while being inside the second region.

43. The apparatus of claim 42 wherein the supplemental content is a tool tip.

44. The apparatus of claim 42 wherein the control region identifier is further to display borders of the second region when the second region is defined, and to cancel the display of the borders upon detecting the motion of the cursor outside of the second region.

45. The apparatus of claim 42 wherein the interface element controller is to further cancel the display of the interface element upon detecting that the cursor is positioned outside of the second region.

46. The apparatus of claim 42 wherein the interface element controller is to display the interface element at a predefined offset from the current position of the cursor.

47. The apparatus of claim 42 further comprising a content display modifier to alter the display of the supplemental content upon detecting a user action pertaining to the interface element.

48. The apparatus of claim 47 wherein the content display modifier is to alter the display of the supplemental content by altering the size of an area displaying the supplemental content.

49. The apparatus of claim 47 wherein the content display modifier is to alter the display of the supplemental content by scrolling through the supplemental document.

50. The apparatus of claim 47 wherein the user action comprises pausing the cursor over the interface element for a predefined time period.

51. An apparatus for controlling display of supplemental content on a computer screen, the apparatus comprising:
   a content detector to detect that the supplemental content is visible in a separate window on the computer screen;
   a cursor motion controller to detect an occurrence of at least one event related to a cursor motion;
   an interface element controller to display an interface element associated with the visible supplemental content when the occurrence of the at least one event related to the cursor motion is detected;
   a control region identifier to define a control region covering at least a portion of the interface element and a current position of the cursor;
   a content display modifier to change appearance of at least a portion of the separate window to indicate that the removal of the supplemental content can be triggered by detecting the cursor outside of the control region; and
   a content removal controller to cancel the display of the supplemental content upon detecting that the cursor is positioned outside of the control region.

52. The apparatus of claim 51 wherein the cursor motion controller is to detect the occurrence of at least one event related to the cursor motion by detecting that a change in a cursor position has been below a predefined threshold over a predetermined time interval.

53. The apparatus of claim 51 wherein the cursor motion controller is to detect the occurrence of at least one event related to the cursor motion by detecting the absence of the cursor motion over a predetermined time interval.

54. The apparatus of claim 51 wherein the content removal controller is to refrain from canceling the display of the supplemental content until the display of the interface element continues for a predefined time period.

55. The apparatus of claim 51 wherein the interface element controller is to determine that the supplemental content satisfies at least one requirement prior to displaying the interface element.

56. The apparatus of claim 55 wherein at least one requirement includes any one of a requirement that the retrieval of the supplemental content over a computer network be completed, a requirement that the supplemental content be an advertisement, a requirement that the supplemental content be a message sent to a user over the computer network, a requirement that the supplemental content be a message generated by a user computer, and a requirement that the window containing the supplemental content be a child of a window containing the current position of the cursor.

57. The apparatus of claim 51 wherein the interface element includes a link associated with the supplemental content.

58. An apparatus to control display of supplemental content on a computer screen, the apparatus comprising:
   a cursor motion controller to detect an occurrence of at least one event related to a cursor motion while the supplemental content is visible on the computer screen and to identify a position of the cursor at the time the occurrence was detected;
   a control region identifier to define a control region covering the identified position of the cursor, the control region having at least one border segment located at a predefined distance from the identified position of the cursor; and
   a content removal controller to cancel the display of the supplemental content upon detecting that the cursor is positioned outside of the control region,
   wherein the control region identifier is further to define a second control region for second supplemental content visible on the computer screen, the second control region covering a second position of the cursor and having at least one border segment that is different from a corresponding border segment of the control region associated with the prior supplemental content.

59. The apparatus of claim 58 wherein the supplemental content is contained in a separate window.

60. The apparatus of claim 58 wherein the cursor motion controller is to detect the occurrence of at least one event related to the cursor motion by detecting that a change in a cursor position has been below a predefined threshold over a predetermined time interval.

61. The apparatus of claim 58 wherein the cursor motion controller is to detect the occurrence of at least one event related to the cursor motion by detecting the absence of the cursor motion over a predetermined time interval.

62. The apparatus of claim 58 wherein at least one border segment of the second control region is located at the same distance from the second cursor position as the corresponding border segment of the control region associated with the prior supplemental content is located from the prior cursor position.

63. The apparatus of claim 58 wherein the second control region has the same shape and the same offset from the cursor position as the control region associated with the prior supplemental content.

64. The apparatus of claim 58 wherein the second control region has at least one border segment that is the same as a border segment of the control region associated with the prior supplemental content.

65. A computer readable medium that provides instructions, which when executed on a processor, cause said processor to perform operations comprising:
   detecting that the supplemental content is displayed on the computer screen, the display of the supplemental content being controlled by a cursor position relative to a predefined first region;
   triggering display of an interface element associated with the supplemental content when a cursor is positioned inside the first region;
   defining a second region covering at least a portion of the interface element and a current position of the cursor; and
   if the cursor is positioned inside the second region, continuing the display of the supplemental content upon detecting that the cursor is positioned outside of the first region.

66. A computer readable medium that provides instructions, which when executed on a processor, cause said processor to perform operations comprising:
   detecting that the supplemental content is visible on the computer screen;
   refraining from displaying an interface element until a cursor is detected outside of a computer screen area in which the supplemental content is displayed;
   displaying the interface element associated with the visible supplemental content upon detecting an occurrence of at least one event related to a cursor motion;
   defining a control region covering at least a portion of the interface element and a current position of the cursor; and
   canceling the display of the supplemental content upon detecting that the cursor is positioned outside of the control region.

67. A computer readable medium that provides instructions, which when executed on a processor, cause said processor to perform operations comprising:
   detecting an occurrence of at least one event related to a cursor motion while the supplemental content is visible in a separate window on the computer screen;
   identifying a position of the cursor at the time the occurrence was detected;
   defining a control region covering the identified position of the cursor, the control region having at least one border segment located at a predefined distance from the identified position of the cursor;
   canceling the display of the supplemental content upon detecting that the cursor is positioned outside of the control region;
   detecting display of second supplemental content after canceling the display of the prior supplemental content;
   detecting a second occurrence of at least one event related to the cursor motion while the second supplemental content is visible on the computer screen;
   identifying a second position of the cursor at the time the second occurrence was detected;
   defining a second control region covering the second position of the cursor, the second control region having at least one border segment that is different from a corresponding border segment of the control region associated with the prior supplemental content; and
   canceling the display of the second supplemental content upon detecting that the cursor is positioned outside of the second control region.

* * * * *